(12) United States Patent
Heller (10) Patent No.: US 8,387,311 B2
(45) Date of Patent: Mar. 5, 2013

(54) VEHICLE DOOR ASSEMBLY FOR PREVENTING OPENING OF THE DOOR DURING OUTER HANDLE INTRUSION EVENT

(75) Inventor: Aaron Heller, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 12/764,581

(22) Filed: Apr. 21, 2010

(65) Prior Publication Data

US 2011/0258935 A1 Oct. 27, 2011

(51) Int. Cl.
*E06B 3/00* (2006.01)

(52) U.S. Cl. .................. 49/503; 296/146.1; 296/187.12

(58) Field of Classification Search .............. 49/503; 292/216, 336.3, DIG. 23, DIG. 30, DIG. 65, 292/1, 127; 296/146.1, 187.12
See application file for complete search history.

(56) References Cited

U.S. PATENT DOCUMENTS

| | | | | |
|---|---|---|---|---|
| 3,054,634 | A | * | 9/1962 | Westerdale ............... 292/336.3 |
| 4,382,622 | A | | 5/1983 | Ishikawa |
| 4,478,445 | A | * | 10/1984 | Shimizu .................... 292/336.3 |
| 4,508,379 | A | * | 4/1985 | Mochida .................... 292/336.3 |
| 4,995,654 | A | | 2/1991 | Nishigami et al. |
| 5,584,516 | A | | 12/1996 | Cetnar |
| 6,264,257 | B1 | * | 7/2001 | Meinke ...................... 292/336.3 |
| 6,880,867 | B2 | * | 4/2005 | Schoen et al. ............... 292/216 |
| 7,111,880 | B2 | | 9/2006 | Saitoh |
| 7,198,307 | B2 | | 4/2007 | Drysdale et al. |
| 7,431,357 | B2 | * | 10/2008 | Pudney ...................... 292/336.3 |
| 7,699,366 | B2 | * | 4/2010 | Hanaki et al. .............. 292/336.3 |
| 8,079,631 | B2 | * | 12/2011 | Higgins et al. ............. 296/146.1 |
| 8,128,151 | B2 | * | 3/2012 | Teramoto et al. .......... 296/146.1 |
| 2004/0251693 | A1 | * | 12/2004 | Schoen et al. .................... 292/1 |
| 2006/0055185 | A1 | | 3/2006 | Tanaka et al. |
| 2007/0024068 | A1 | | 2/2007 | Wood |
| 2007/0069525 | A1 | * | 3/2007 | Ghannam ..................... 292/216 |
| 2008/0185850 | A1 | * | 8/2008 | Takaya et al. .............. 292/336.3 |
| 2008/0277947 | A1 | * | 11/2008 | Costigan ................... 292/336.3 |
| 2009/0064591 | A1 | * | 3/2009 | Keller et al. ................... 49/358 |
| 2010/0019512 | A1 | * | 1/2010 | Gschweng et al. .......... 292/217 |
| 2010/0109350 | A1 | * | 5/2010 | Gschweng et al. .......... 292/196 |
| 2011/0062747 | A1 | * | 3/2011 | Teramoto et al. .......... 296/146.1 |
| 2011/0115251 | A1 | * | 5/2011 | Jordan et al. .............. 296/146.1 |
| 2011/0115252 | A1 | * | 5/2011 | Higgins et al. ............. 296/146.1 |

* cited by examiner

*Primary Examiner* — Jerry Redman
(74) *Attorney, Agent, or Firm* — Rankin Hill & Clark LLP (57) ABSTRACT

A vehicle door assembly includes an outer handle assembly, a latch mechanism, a rod, and a contact surface. The outer handle assembly includes a moveable handle. The latch mechanism includes a latch for engaging a striker and an outer handle lever operably connected to the latch. The rod connects the outer handle assembly to the latch mechanism. The contact surface is associated with the vehicle door and is inwardly offset from the rod. The contact surface is positioned with respect to the rod such that inward lateral movement of the handle during an outer handle intrusion event results in the rod moving laterally inward and impacting the contact surface. Impact with the contact surface by the rod inhibits the rod from moving the outer handle lever in an unlatching direction.

20 Claims, 9 Drawing Sheets

VEHICLE DOOR ASSEMBLY FOR PREVENTING OPENING OF THE DOOR DURING OUTER HANDLE INTRUSION EVENT

BACKGROUND

This disclosure generally relates to a vehicle door assembly for preventing the vehicle door from opening during an outer handle intrusion event.

Manual operation of a door latch mechanism for a vehicle door is typically through the use of an outer door handle connected via a rod to a latch mechanism. To prevent the door from opening during a crash event that results in the outer door handle deforming laterally inward, a counterweight has been provided on an internal side of the vehicle door connected with the outer door handle. The counterweight acts on movement of the door handle to prevent the door handle from stroking the link rod downward, which could result in the latch mechanism moving to an open position. Typically, the counterweight is rotationally coupled to the door handle using a spring arrangement so that inertial movement of the door handle is countered by corresponding inertial movement of the counterweight in the event of abnormal accelerations of the vehicle. Due to the normal orientation of door handles on a vehicle, this would normally be relevant when the vehicle experiences a side impact. A problem with known counterweight designs is that during a vehicle roll-over event causing inward deformation of the door handle, the inertia of the mass of the counterweight may be insufficient to prevent downward stroking of the rod, which could result in unintentional opening of the door.

Alternative solutions have included providing the latch mechanism with internal inertia-responsive levers or other components, so that the latch mechanism is locked against opening movements when the latch mechanism experiences abnormal acceleration in specific predetermined axes. These arrangements, however, introduce complexity and cost into latch mechanisms, and moreover cannot be incorporated retrospectively into existing latch mechanism designs.

SUMMARY

An example of a vehicle door assembly that can overcome at least some of the aforementioned shortcomings includes an outer handle assembly, a latch mechanism, a rod, and a contact surface. The outer handle assembly includes a moveable handle. The latch mechanism includes a latch for engaging a striker and an outer handle lever operably connected to the latch. The rod connects the outer handle assembly to the latch mechanism. The contact surface is associated with the vehicle door and is inwardly offset from the rod. The contact surface is positioned with respect to the rod such that inward lateral movement of the handle during an outer handle intrusion event results in the rod moving laterally inward and impacting the contact surface. Impact with the contact surface by the rod inhibits the rod from moving the outer handle lever in an unlatching direction.

A method for assembly of a vehicle door to reduce the likelihood that a latch mechanism moves into an open position during an outer handle intrusion event includes connecting an outer handle assembly to a latch mechanism via a rod that is stroked in a releasing direction to move a latch of the latch mechanism in an open position and positioning a contact surface within the vehicle door offset inwardly with respect to the rod such that lateral inward movement of the handle during an outer handle intrusion event results in the rod moving laterally inward and impacting the contact surface. Impact with the contact surface by the rod inhibits the rod from moving the outer handle lever direction in an unlatching direction.

Another example of a vehicle door assembly that can overcome at least some of the aforementioned shortcomings includes an outer handle assembly, a latch mechanism, a rod, an internal frame member, and a bracket. The outer handle assembly includes a moveable handle. The latch mechanism includes a latch for engaging a striker and an outer handle lever operably connected to the latch. The rod connects the outer handle assembly to the latch mechanism. Movement of the handle in an opening direction results in the rod being stroked in a releasing direction to move the outer handle lever toward an unlatching direction, which moves the latch toward a disengaging direction to disengage the striker. When the rod is connected to the outer handle lever and is in an initial position prior to movement of the handle in the opening direction, the latch is in a closed position where the latch engages the striker. When the rod is connected with the outer handle lever and is stroked a distance d in the releasing direction, the latch is in an open position where the latch is disengaged from the striker. The internal frame member is inwardly offset from the handle and the rod. The bracket mounts to the internal frame member and includes a contact surface that is inwardly offset from the rod. The bracket is positioned with respect to the rod such that inward lateral movement of the handle during an outer handle intrusion event results in the rod moving laterally inward and impacting the contact surface. The bracket and the rod are configured to cooperate such that after impact with the contact surface of the bracket by the rod further movement of the rod in the releasing direction is inhibited

DETAILED DESCRIPTION

Figures 1, 1A:
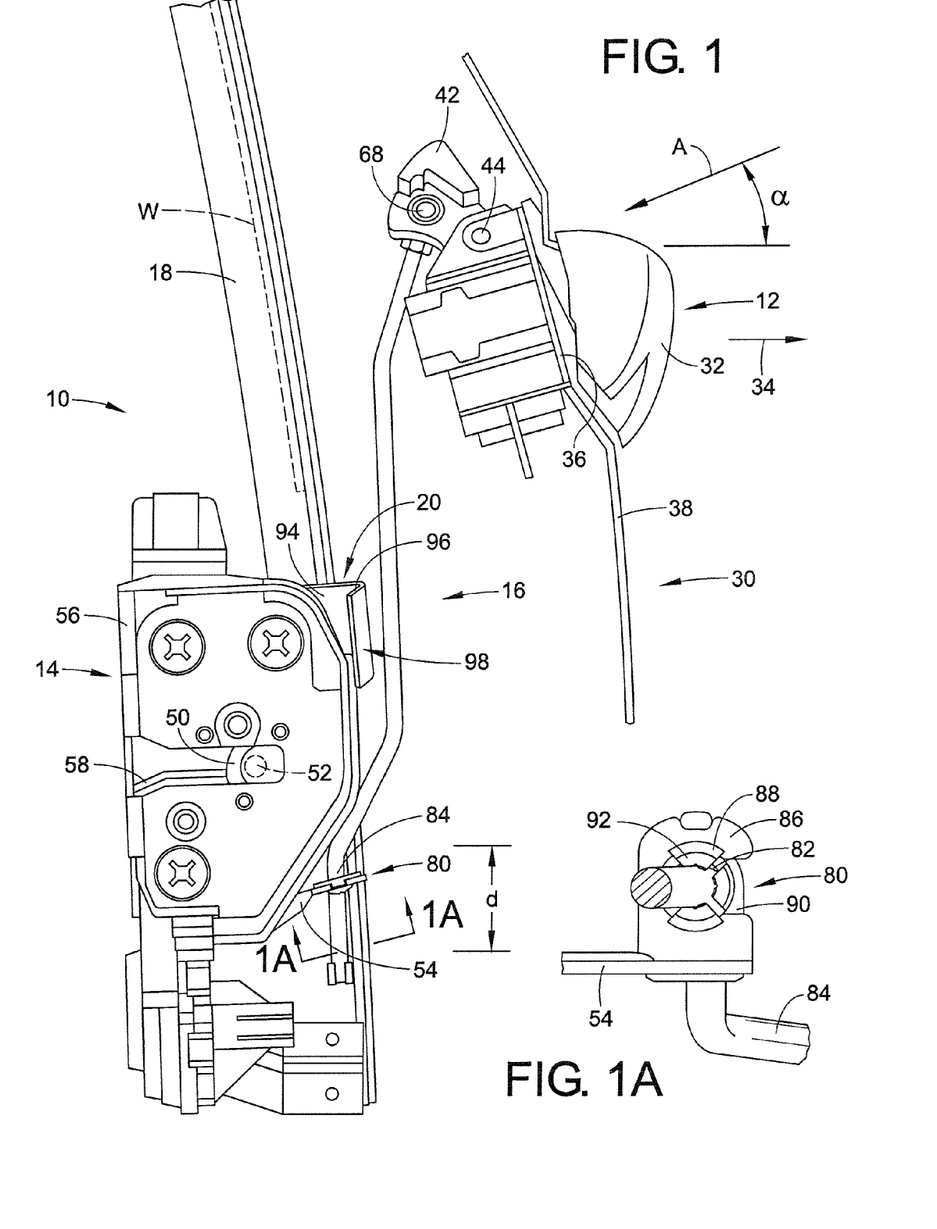
FIG. 1 is a side schematic view of a vehicle door assembly depicting a latch of a latch mechanism in a closed position where the latch engages a striker.
FIG. 1A is a cross-sectional view taken along line 1A-1A in FIG. 1.

With reference to FIG. 1, a vehicle door assembly 10 includes an outer handle assembly 12, a latch mechanism 14, a rod 16, an internal frame member 18, and a bracket 20. The vehicle door assembly is configured to reduce the likelihood of a vehicle door 30, only a portion of which is depicted in FIG. 1, from unintentionally opening during an outer handle intrusion event, which can result in a force being applied on the outer handle assembly 12 in the direction of arrow A, which can be angularly offset from horizontal by an angle α.

Figure 2:
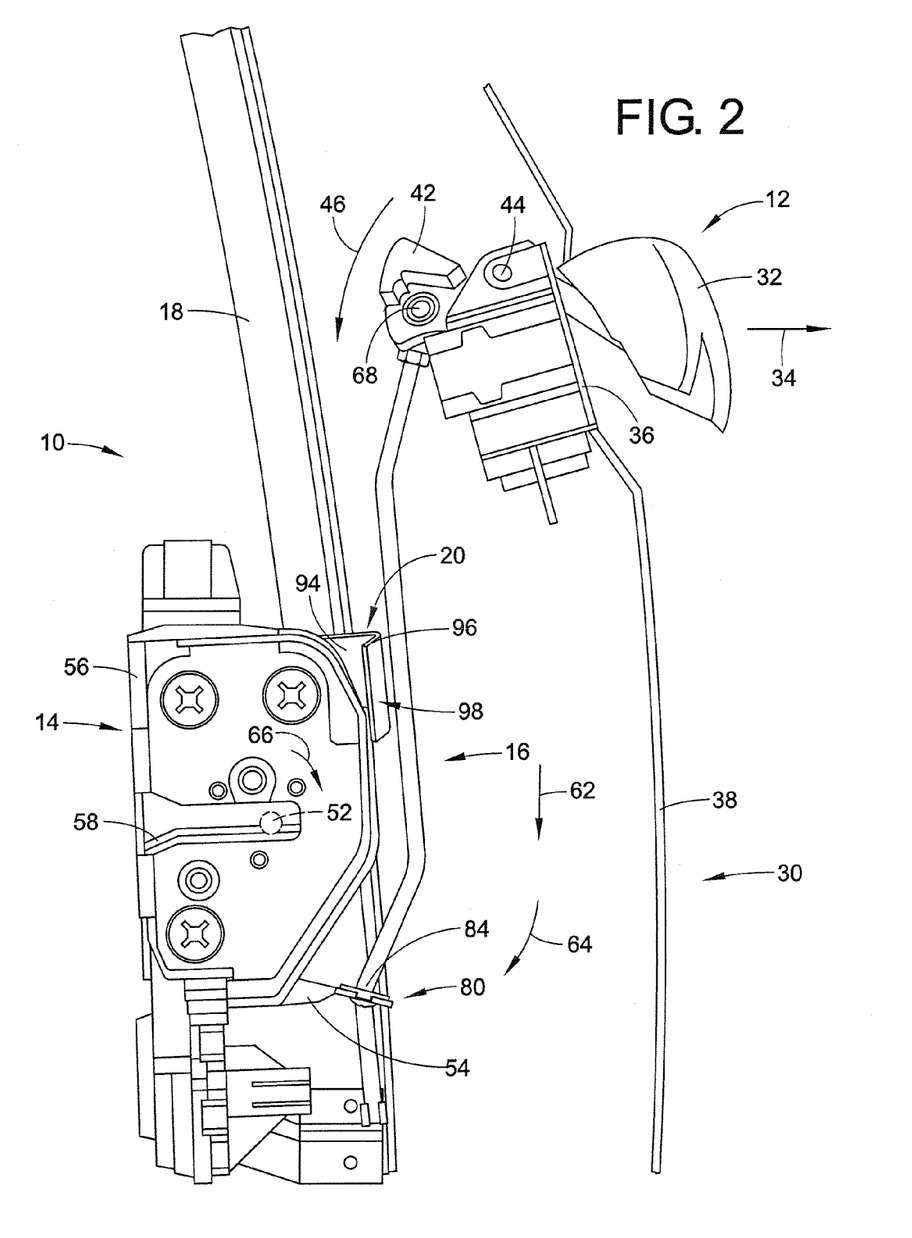
FIG. 2 is a side schematic view of the vehicle door assembly depicted in FIG. 1 showing the latch of the latch mechanism in an open position where the latch is disengaged from the striker.

The outer handle assembly 12 includes a moveable handle 32. The handle 32 is moveable in an opening direction, which is depicted by arrow 34 in FIG. 2, to open the vehicle door 30. The handle 32 can move in other directions, e.g. pivot about a generally horizontal axis. The outer handle assembly 12 includes a mounting bracket 36 that is mounted on an interior surface of an outer panel 38 of the vehicle door 30. The handle 32 operably connects with a counterweight 42, or other pivoting member, which is connected to the mounting bracket 36 via a pivot 44. With reference to FIG. 2, the counterweight 42 is operably connected with the moveable handle 32 such that the counterweight pivots in the direction of arrow 46 when the handle 32 is moved in the opening direction. The outer handle assembly 12 mounts to the outer panel 38 of the vehicle door 30 and the vehicle door 30 is hingedly connected to a vehicle frame (not shown) via hinges (not shown) in a conventional manner. The handle assembly 12 can be of a conventional design, accordingly further description thereof is not provided.

With reference back to FIG. 1, the latch mechanism 14 includes a latch 50 for engaging a striker 52 (depicted schematically in FIG. 1) and an outer handle lever 54 operably connected to the latch 50. The latch mechanism 14 mounts to an edge of the door 30 opposite the hinges (not shown) and cooperates with the striker 52 to retain the door in a closed position. The latch mechanism 14 includes a housing 56 having a channel 58 that receives the striker 52 to place the vehicle door 30 in a closed position. The latch 50 is pivotally mounted in the housing 56 and is biased toward a closed position, where the latch 50 engages the striker 52. The outer handle lever 54 is also pivotally connected with the housing 56.

The rod 16 connects the outer handle assembly 12 to the latch mechanism 14. With reference to FIG. 2, movement of the handle 32 in the opening direction (arrow 34) results in the rod being stroked in a releasing direction (downward arrow 62) to move, e.g. pivot, the outer handle lever 54 toward an unlatching direction (arrow 64), which moves, e.g. pivots, the latch 50 (not visible in FIG. 2) toward a disengaging direction (arrow 66) to disengage the striker 52. When the rod 16 is connected with the outer handle lever 54 and is in an initial position prior to movement of the handle 32 in the opening direction (as depicted in FIG. 1), the latch 50 is in a closed position where the latch engages the striker 52. When the rod 16 is connected with the outer handle lever 54 and is stroked a distance d (see FIG. 1) in the releasing direction (arrow 62), the latch 50 is in open position where the latch is disengaged from the striker 52. In the illustrated embodiment, the rod 16 includes a bent upper end portion 68 that is pivotally connected with the counterweight 42 such that pivotal movement of the counterweight 42 in the direction of arrow 46 (FIG. 2) results in the rod 16 stroking in the releasing direction (arrow 62), thus pivoting the outer handle lever 54 toward the unlatching direction (arrow 64).

The vehicle assembly door 10 further includes a rod holder clip 80 including an opening 82. A lower end portion 84 of the rod 16 is received in the opening 82 to fix the rod holder clip 80 to the rod 16. In the embodiment illustrated in FIGS. 1-3, the outer handle lever 54 includes an outboard U-shaped terminal portion 86 (FIG. 1A) that is open laterally outboard and the rod 16 is received in the U-shaped terminal portion. More particular to the embodiment illustrated in FIG. 1, the rod holder clip 80 is received in the U-shaped terminal portion 86 of the outer handle lever 54. As will be described in more detail below, the rod holder clip 80 is configured to deform during an outer handle intrusion event to disengage the rod holder clip 80 and the rod 16 from the outer handle lever 54 during the outer handle intrusion event. To allow for this deformation, the rod holder clip 80 includes a plurality of tabs 88 extending normally from a base 90. Only the lower tabs 88 are visible in FIG. 1A. The rod holder clip 80 can include upper tabs on an opposite (upper) side of the base 90 that are similarly configured to engage the U-shaped terminal portion 86. The tabs 88 engage outer handle lever 54 when received in the U-shaped terminal portion 86. The rod holder clip 80 also includes a plurality of barbs 92, or catches, that also extend from the base 90 in the same general direction as the upper tabs 88. The barbs 92 extend toward the center of the opening 82 in the rod holder clip 80 and engage the rod 90 to fix the rod to the outer handle lever 54.

The vehicle door assembly 10 further includes the internal frame member 18, which is inwardly offset from the handle 32 and the rod 16. The bracket 20 mounts to the internal frame member 18. In the illustrated embodiment, the internal frame member 18 is a lower sash member that carries a window pane W (FIG. 1) typically found in vehicle doors. The internal frame member 18 is a portion of the vehicle door assembly that receives the window pane when the window pane is lowered into the vehicle door 30 to open the window of the vehicle door. The internal frame member 18 is also laterally inwardly offset from the outer door panel 38. The bracket 20, however, can attach to another component of the vehicle door 30, including an internal frame member other than the window sash.

Figure 3:
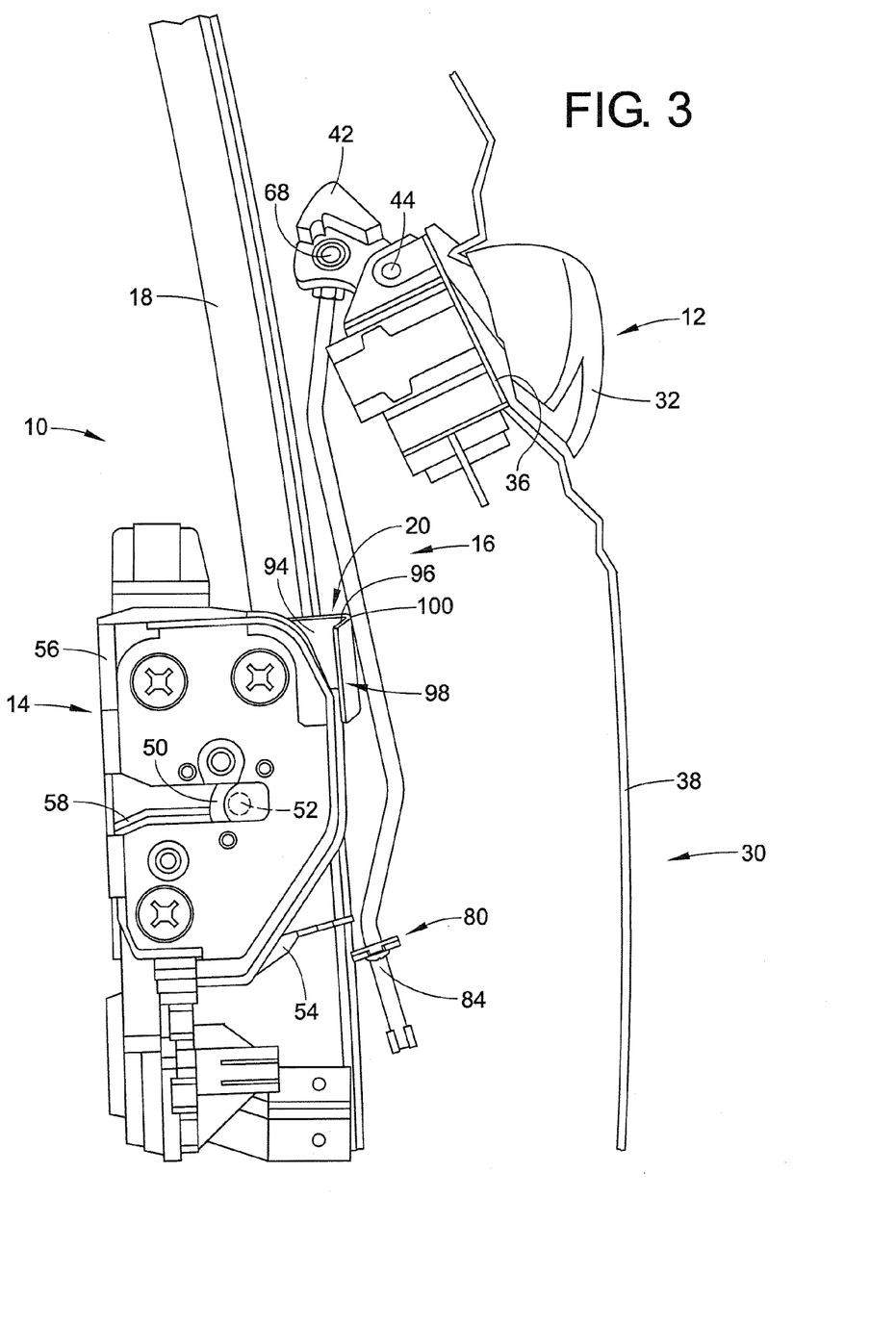
FIG. 3 is a side schematic view of the vehicle door assembly of FIG. 1 after an outer handle intrusion event.

In the illustrated embodiment, the bracket 20 is generally L-shaped including a mounting leg 94 that is fastened or welded to the internal frame member and a contact leg 96 defining a contact surface 98. The contact surface 98 in the illustrated embodiment is generally planar and is inwardly offset from the rod 16. With reference to FIG. 3, the bracket 20 is positioned with respect to the rod 16 such that inward lateral movement of the handle 32 during the outer handle intrusion event results in the rod 16 moving laterally inward and impacting the contact surface 98.

The contact surface 98 has been described above as being disposed on the bracket 20; however, this is not required. The contact surface 98 can be associated with the vehicle door 30, e.g., be associated with a component of the vehicle door other than the bracket. For example, the contact surface can be associated with the internal frame member 18, whether the internal frame member is a lower sash member or the internal frame member is another internal component of the vehicle. Such a contact surface can still be inwardly offset from the rod 16 such that inward lateral movement of the handle during an outer handle intrusion event results in the rod moving laterally inward and impacting the contact surface. Impact with the contact surface 98, whether the contact surface is located on the bracket 20 or not, by the rod 16 can inhibit the rod from moving the outer handle lever 54 in the unlatching direction 64.

In a typical vehicle door assembly, during a roll-over event the handle 32 can deform laterally inward, which can result in the rod 16 stroking downward in the releasing direction (arrow 62) which can result in the outer handle lever 54 moving in the unlatching direction (arrow 64), which can result in the latch 50 moving in the disengaging direction (arrow 66). In the illustrated embodiment, however, impact with the contact surface 98 by the rod 16 inhibits the rod from moving the outer handle lever 54 in the unlatching direction. Accordingly, the vehicle door 30 can remain closed during the outer handle intrusion event. More particular to the embodiment disclosed in FIGS. 1-3, the contact surface 98 is positioned with respect to the rod 16 such that the rod strokes less than the distance d in the releasing direction (arrow 62) prior to the rod impacting the contact surface 98 during the outer handle intrusion event. More particularly, the contact surface 98 can be positioned with respect to the rod 16 such that the rod strokes less than a distance 0.4 d, less than a distance 0.5 d, less than a distance 0.6 d or even less than a distance 0.7 d in the releasing direction (arrow 62) prior to the rod impacting the contact surface 98 during the outer handle intrusion event. Accordingly, the rod 16 fails to stroke a distance sufficient to place the latch 50 in the open position during the outer handle intrusion event.

In the embodiment illustrated in FIGS. 1-3, the rod holder clip 80, which is attached to a lower end portion 84 of the rod 16, is configured to deform during the outer handle intrusion event to disengage the rod holder clip and the rod from the outer handle lever 54 during the outer handle intrusion event. The tabs 88 that engage the U-shaped portion 86 of the outer handle lever 54 can deform so that the rod holder clip 80 no longer engages the outer handle lever, e.g. the rod holder clip 80 and the rod 16 slide through the outer open end of the U-shaped portion 86. Accordingly, because the handle 16 disengages from the outer handle lever 54, the outer handle lever is inhibited from further movement in the unlatching direction (arrow 64), which inhibits the latch 50 from movement in the disengaging direction (arrow 66). With reference to FIG. 3, pivotal movement of the rod 16 about a location 100 on the rod where the rod impacts the contact surface 98 during the outer handle intrusion event results in the rod disengaging from the outer handle lever 54.

Figure 4:
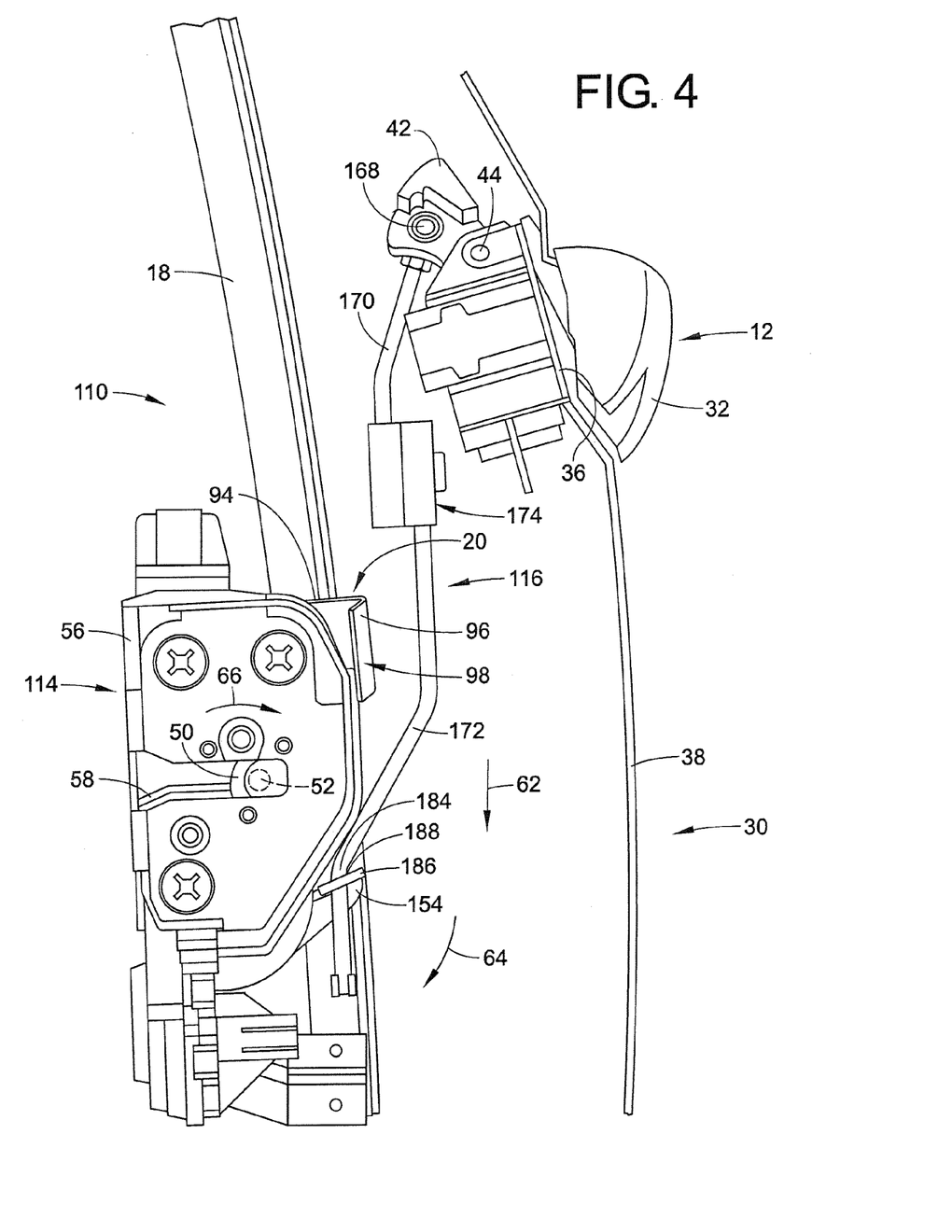
FIG. 4 is a side schematic view of another embodiment of a vehicle door assembly depicting a latch of a latch mechanism in a closed position.
Figure 5:
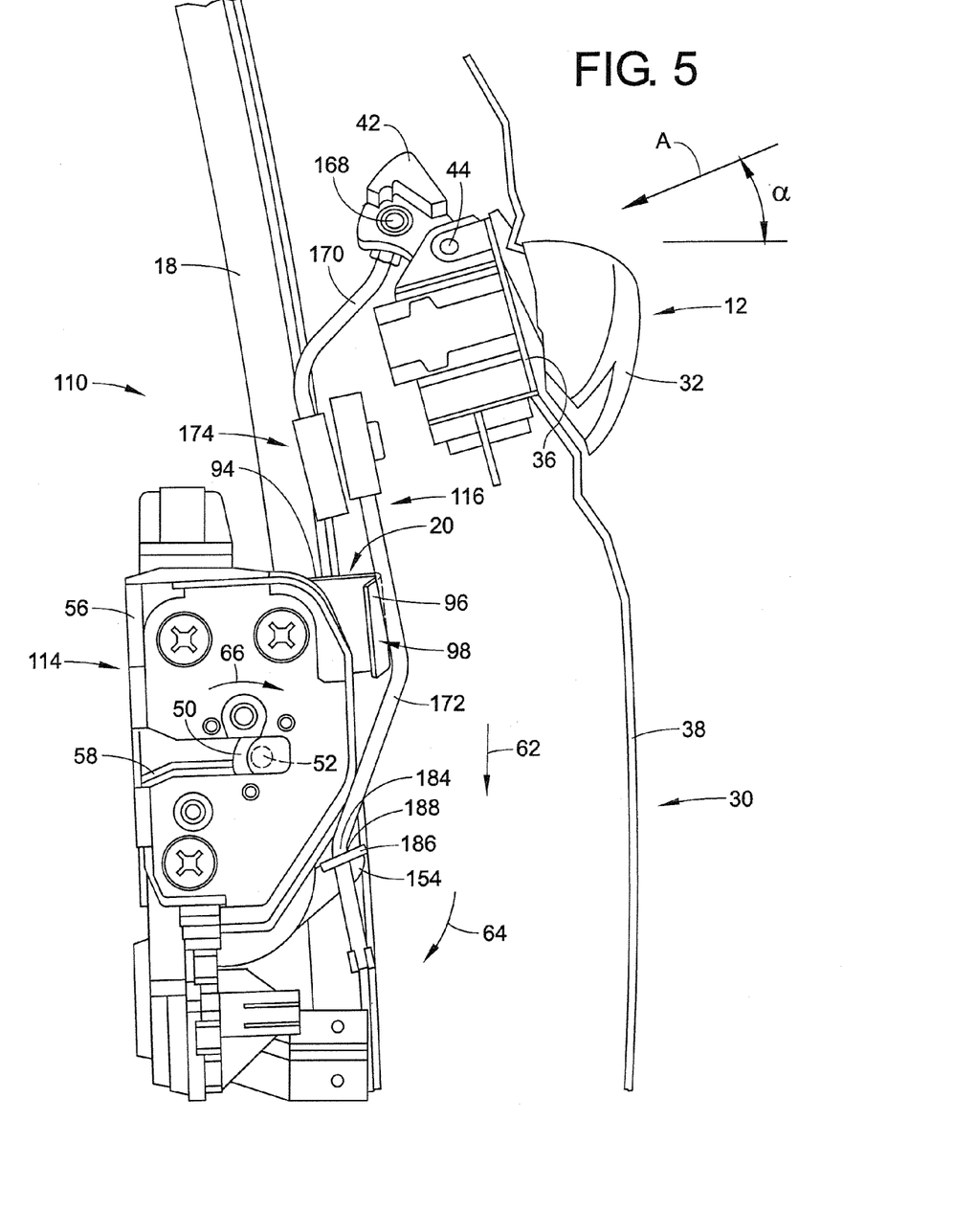
FIG. 5 is a side schematic view of the vehicle door assembly depicted in FIG. 4 after an outer handle intrusion event.

An alternative embodiment of a vehicle door assembly 110 is depicted in FIGS. 4 and 5. Like numerals refer to like parts between the embodiment shown in FIGS. 1-3 and the embodiment shown in FIGS. 4 and 5. The vehicle door assembly 110 includes the handle assembly 12, a latch mechanism 114, a rod 116, the internal frame member 18, and the bracket 20. The handle 12, the internal frame member 18 and the bracket 20 have the same configuration as those described with reference to FIGS. 1-3.

Similar to the latch mechanism 14 described with reference to FIGS. 1-3, the latch mechanism 114 in FIGS. 4 and 5 includes the latch 50 for engaging the striker 52 and the housing 56 defining a channel 58 for receiving the striker 52. Similar to the embodiment described with reference to FIGS. 1-3, the latch 50 is mounted for pivotal movement within the housing 56 and is moveable between a closed position (shown in FIG. 4) where the latch engages the striker 52 and an open position (not shown) where the latch is disengaged from the striker. The latch mechanism 114 in FIGS. 4 and 5 includes an outer handle lever 154 that is also pivotally mounted to the housing 56. The outer handle lever 154 is operably connected to the latch 50 in the same manner as as the handle lever 54 described above. Accordingly, movement of the outer handle lever 54 in the unlatching direction results in movement of the latch 50 in the disengaging position. Different than the outer handle lever 54 described with reference to FIGS. 1-3, the outer handle lever 154 includes a distally outboard annular section 186 having an opening 188 that receives a lower end portion 184 of the rod 116. A rod holder clip (not shown) similar to the rod holder clip 80 can be utilized to connect the rod 116 to the annular portion 186 of the outer handle lever 154. If desired, the outer handle lever 54, described above, could replace the outer handle lever 154 shown in FIGS. 4 and 5.

The vehicle assembly door 110 depicted in FIGS. 4 and 5 also includes the rod 116 connecting the outer handle assembly 12 to the latch mechanism 114. The rod 116 in the embodiment depicted in FIGS. 4 and 5 includes an upper rod 170 engaging the outer handle assembly 12, a lower rod 172 engaging the latch mechanism 114, and a coupling mechanism 174 coupling the upper rod 170 to the lower rod 172. In the illustrated embodiment of FIGS. 4 and 5, the rod 116, and more particularly the upper rod 170, includes a bent upper end portion 168 that is pivotally connected with the counterweight 42 such that clockwise (per the orientation of FIG. 4) pivotal movement of the counterweight 42 results in the rod 116 stroking in the releasing direction (arrow 62), thus pivoting the outer handle lever 154 toward the unlatching direction (arrow 64).

With reference to FIG. 5, the upper rod 170 decouples from the lower rod 172 as the result of the rod 116 impacting the contact surface 98 of the bracket 20 during the outer handle intrusion event. As discussed above, the contact surface 98 can be associated with the vehicle door 30, e.g., be associated with a component of the vehicle door other than the bracket. More particularly, the upper rod 170 can decouple from the lower rod 172 as the result of the lower rod 172 impacting the contact surface 98 of the bracket 20 during the outer handle intrusion event. The coupling mechanism 170 can be a conventional coupling mechanism that is configured to disconnect when a force is applied to at least one of the upper rod 170 or the lower rod 172 in a direction generally perpendicular to the releasing direction (arrow 62). Such a conventional coupling mechanism can include a snap together fitting as well as a conventional type bolt having a releasable head. Accordingly, with reference to FIG. 5 when a force is applied to the outer handle 32 in the direction of arrow A during an outer handle intrusion event, the lower rod 172 contacts the contact surface 98 of the bracket 20 which results in a force being applied to the lower rod in an outboard lateral direction, which is generally perpendicular to the releasing direction (arrow 62) of the rod 116. This results in a disconnection of the upper rod 170 from the lower rod 172 so that further intrusion of the outer handle 32 does not result in further stroking of the lower rod 172 in the releasing direction (arrow 62). Accordingly, the outer handle lever 154 no longer moves in the unlatching direction (arrow 64) and thus, the latch 50 can remain in the closed position during the outer handle intrusion event.

Figure 6:
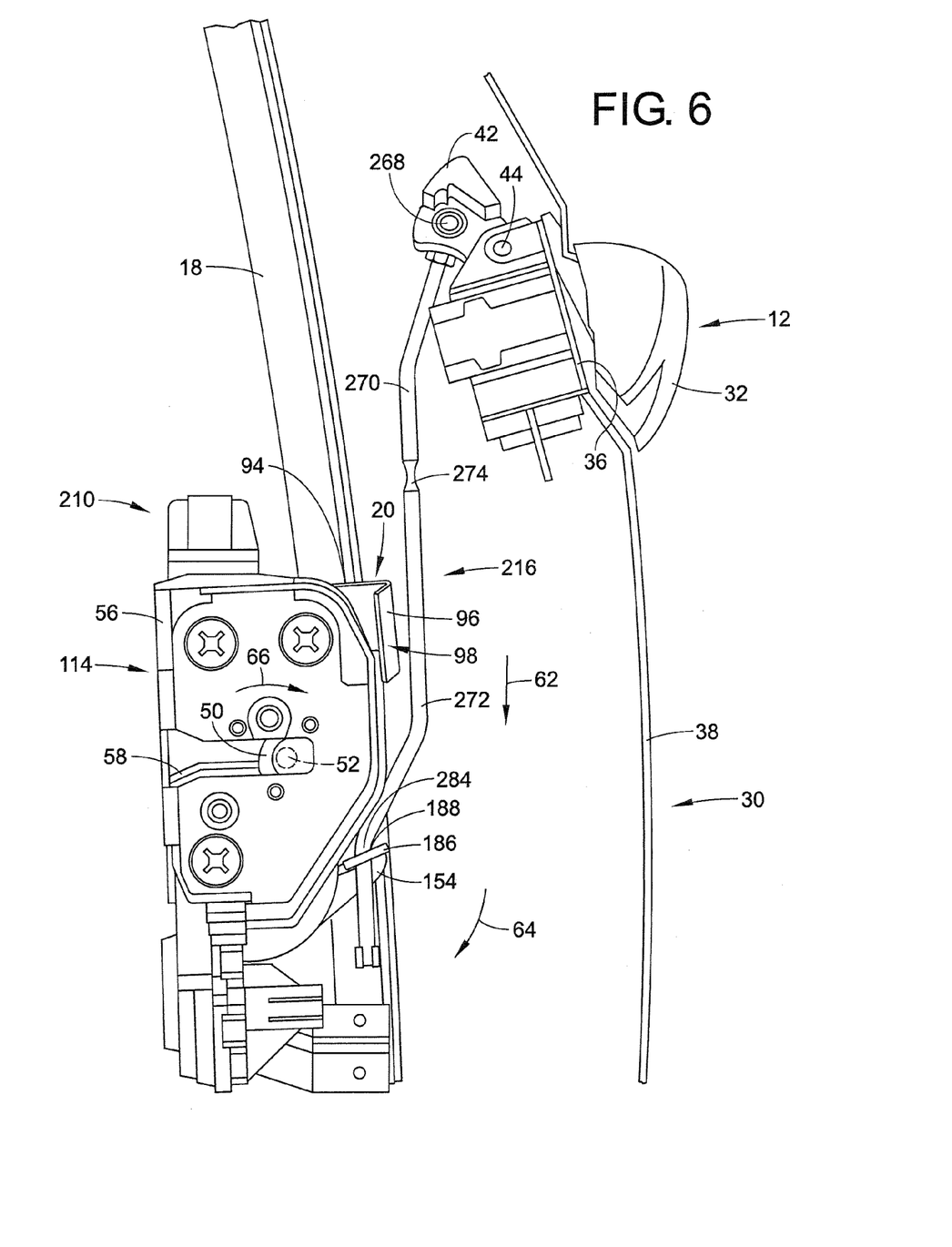
FIG. 6 is a side schematic view of another embodiment of a vehicle door assembly depicting a latch of a latch mechanism in a closed position.
Figure 7:
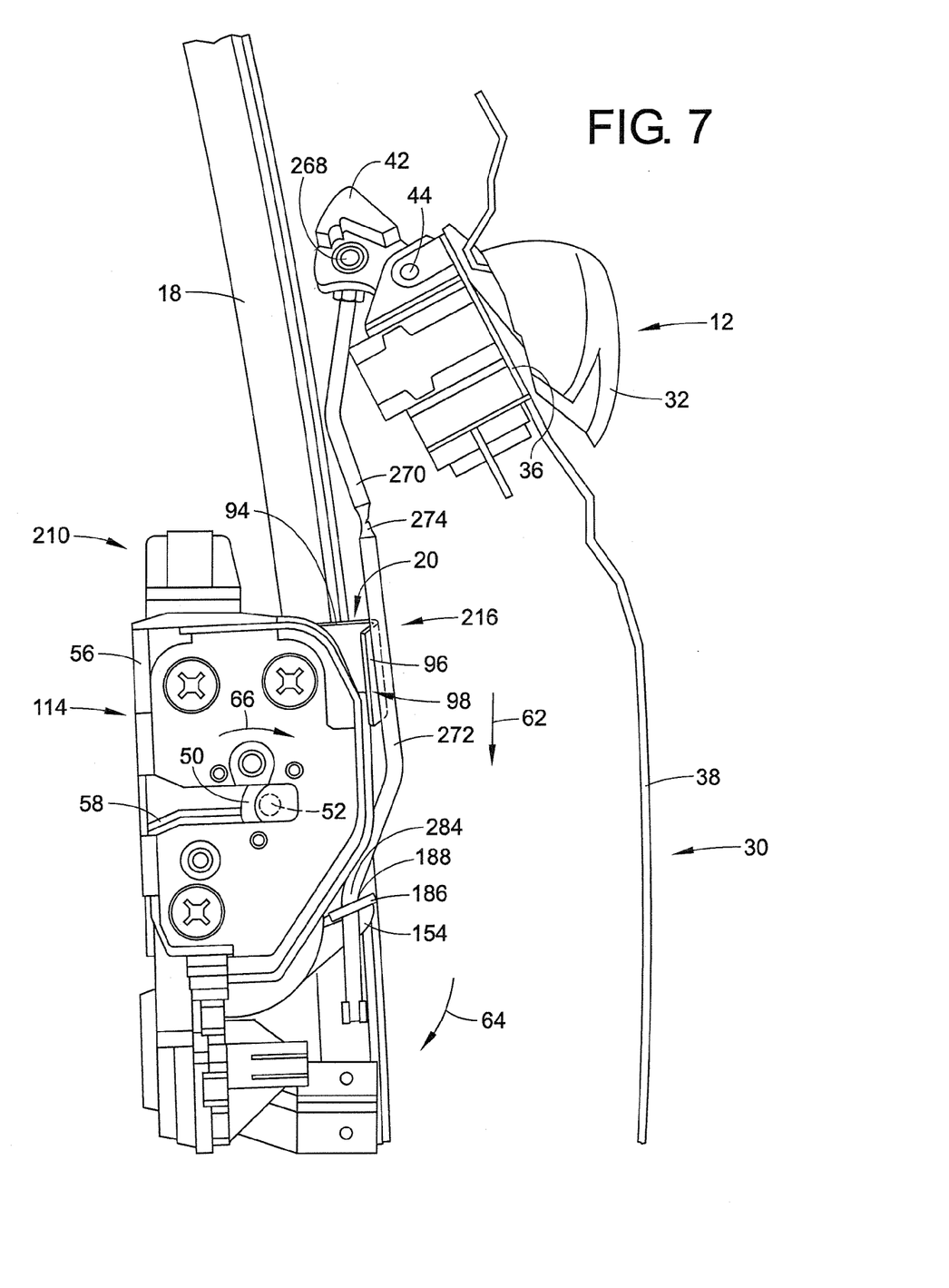
FIG. 7 is a side schematic view of the vehicle door assembly depicted in FIG. 6 during an outer handle intrusion event.

Reference will now be made to FIGS. 6 and 7, which depict another embodiment of a vehicle door assembly 210. Like numerals refer to like parts among the embodiments shown in FIGS. 1-3, FIGS. 4 and 5, and FIGS. 6 and 7. In this embodiment, the vehicle door assembly 210 includes the outer handle assembly 12, the latch mechanism 114, a rod 216, the internal frame member 18, and the bracket 20.

The rod 216 connects the outer handle assembly 12 to the latch mechanism 114. The embodiment depicted in FIGS. 6 and 7 differs from the embodiments depicted in FIGS. 1-5 by including the rod 216 that includes a weakened section 274 where the rod breaks as a result of impact with the contact surface 98 of the bracket 20 during an outer handle intrusion event. In the embodiment depicted in FIGS. 6 and 7, the weakened section 274 is a necked down portion of the rod 216 interconnecting an upper rod portion 270 of the rod to a lower rod portion 272 of the rod. In the illustrated embodiment, the weakened section 274 is disposed vertically above the contact surface 98 of the bracket 20. In the illustrated embodiment of FIGS. 6 and 7, the rod 216, and more particularly the upper rod portion 270, includes a bent upper end portion 268 that is pivotally connected with the counterweight 42 such that clockwise (per the orientation of FIG. 6) pivotal movement of the counterweight 42 results in the rod 216 stroking in the releasing direction (arrow 62), thus pivoting the outer handle lever 154 toward the unlatching direction (arrow 64). A lower end portion 284 of the rod 216, more particularly a lower end portion of the lower rod portion 272, engages the outer handle lever 154. A rod holder clip (not shown) similar to the rod holder clip 80 can be utilized to connect the rod 216 to the annular portion 186 of the outer handle lever 154. If desired, the outer handle lever 54, described above, could replace the outer handle lever 154 shown in FIGS. 6 and 7.

With reference to FIG. 7, during an outer handle intrusion event, the upper rod portion 270 breaks away from the lower rod portion 272 at the weakened section 274 as a result of the rod 216 impacting the contact surface 98 of the bracket 20. As discussed above, the contact surface 98 can be associated with the vehicle door 30, e.g., be associated with a component of the vehicle door other than the bracket. More particularly, the upper rod portion 270 can break away from the lower rod portion 272 as a result of the lower rod portion impacting the contact surface 98 of the bracket 20 during the outer handle intrusion event. Accordingly, during the outer handle intrusion event after the upper rod portion 270 is broken away from the lower rod portion 272, further intrusion of the outer handle 32 does not result further stroking of the lower rod portion 272 in the releasing direction (arrow 62); therefore, the rod 216 no longer moves the outer handle lever 154 in the releasing direction (arrow 64) thus inhibiting movement of the latch 50 in the disengaging direction (arrow 66).

Figure 8:
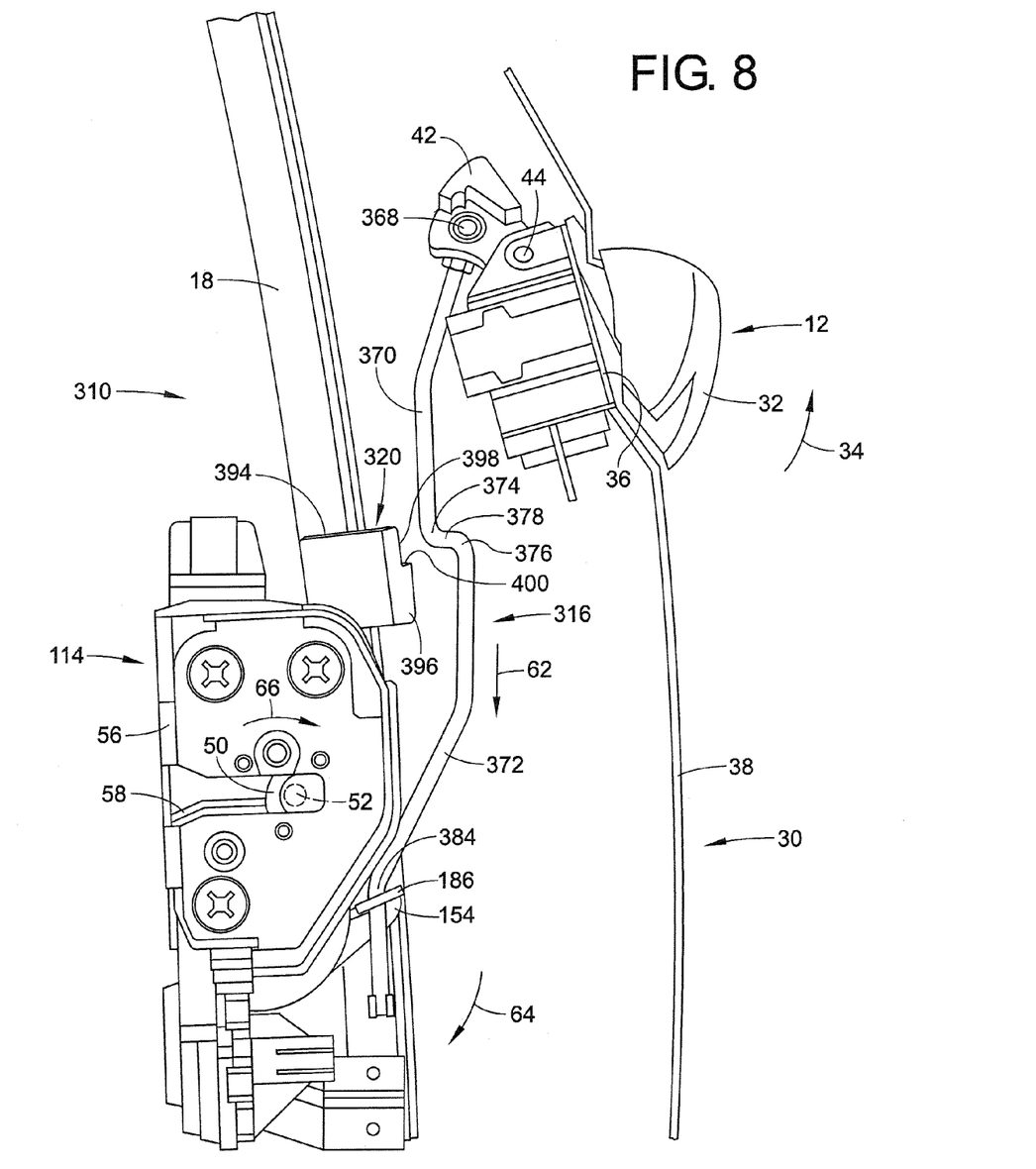
FIG. 8 is a side schematic view of another embodiment of a vehicle door assembly depicting a latch of a latch mechanism in a closed position.
Figure 9:
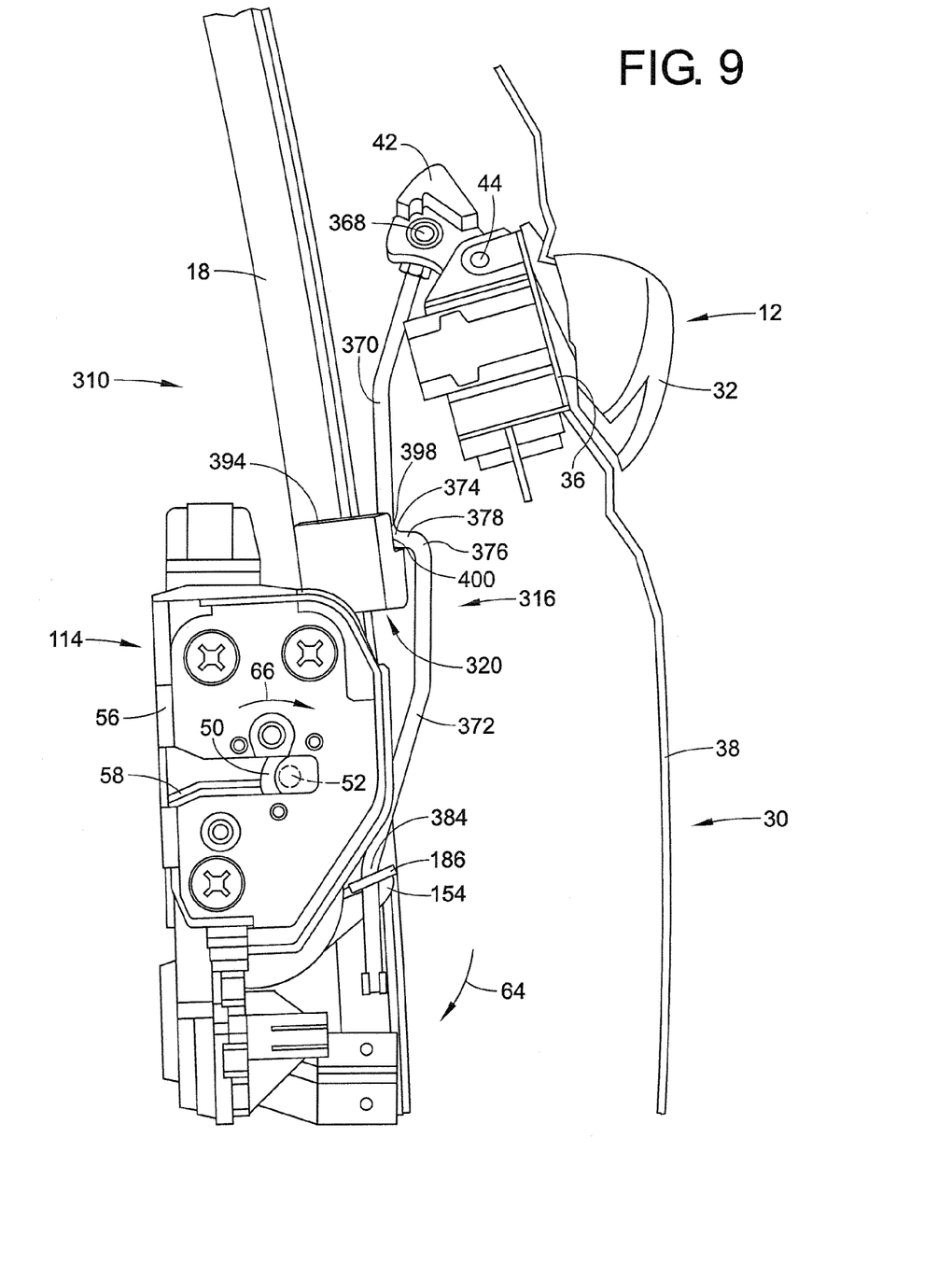
FIG. 9 is a side schematic view of the vehicle door assembly depicted in FIG. 8 after an outer handle intrusion event.

FIGS. 8 and 9 depict yet another embodiment of a vehicle door assembly 310. Like numerals refer to like parts throughout the several embodiments. In the embodiment depicted in FIGS. 8 and 9, the vehicle door assembly 310 includes the outer handle assembly 12, the latching mechanism 114, a rod 316, the internal frame member 18, and a bracket 320.

The rod 316 connects the outer handle assembly 12 to the latch mechanism 114 similar to the rods 16, 116 and 216 described above. Similar to the embodiments described above, movement of the handle 32 in the opening direction (arrow 34) results in the rod 316 being stroked in a releasing direction (arrow 62) to move the outer handle lever 154 toward an unlatching direction (arrow 64), which moves the latch 50 toward a disengaging direction (arrow 66) to disengage the striker 52. When the rod 316 is connected with the outer handle lever 154 and is in an initial position (FIG. 8) prior to movement of the handle 32 in the opening direction, the latch 50 is in a closed position where the latch engages the striker 52. When the rod 316 is connected with the outer handle lever 154 and is stroked a distance d in the releasing direction (arrow 62), the latch 50 is in an open position where the latch is disengaged from the striker 52.

In the embodiment depicted in FIGS. 8 and 9, the rod 316 includes an upper rod section 370 and a lower rod section 372. The upper rod section 370 terminates at a lower bend 374. The lower rod section 372 terminates at an upper bend 376. A transverse section 376 interconnects the upper rod 370 and the lower rod section 372. In the illustrated embodiment of FIGS. 8 and 9, the rod 316, and more particularly the upper rod section 270, includes a bent upper end portion 368 that is pivotally connected with the counterweight 42 such that clockwise (per the orientation of FIG. 8) pivotal movement of the counterweight 42 results in the rod 316 stroking in the releasing direction (arrow 62), thus pivoting the outer handle lever 154 toward the unlatching direction (arrow 64). A lower end portion 384 of the rod 316, more particularly a lower end portion of the lower rod section 372, engages the outer handle lever 154. A rod holder clip (not shown) similar to the rod holder clip 80 can be utilized to connect the rod 316 to the annular portion 186 of the outer handle lever 154. If desired, the outer handle lever 54, described above, could replace the outer handle lever 154 shown in FIGS. 8 and 9.

The bracket 320 mounts to the internal frame member 18 in a similar manner that the bracket 20 (described above) mounts to the internal frame member. The bracket 320 is generally L-shaped including a mounting leg 394 that is fastened to the internal frame member 18 and a contact leg 396 that defines a contact surface 398 formed by a notch 400 in the contact leg. In the embodiment depicted in FIGS. 8 and 9, the bracket 320 is configured to catch the rod 316 as a result of the rod impacting the contact surface 398 of the bracket. The bracket 320 can also be configured to catch the rod 316 as a result of the rod impacting the contact surface 398 of the bracket. More particularly, during an outer handle intrusion event, the rod 316 moves laterally inward and the contact surface 398 and the notch 400 of the bracket 320 is laterally offset but at the same elevation as the transverse member 378 of the rod 316. Accordingly, the lower bend 374 of the upper portion 370 of the rod 316 catches in the notch 400 by contacting the contact surface 398 thus inhibiting further stroking of the rod 316 in the releasing direction (arrow 62) during an outer handle intrusion event.

In each embodiment, impact with the contact surface 98, 398 by the rod 16, 116, 216, 316 inhibits the rod from moving the outer handle lever 54, 154 in the unlatching direction (arrow 64). Also, the contact surface 98, 398 is positioned with respect to the rod 16, 116, 216, 316 such that the rod strokes less than the distance d in the releasing direction (arrow 62) prior to the rod impacting the contact surface during an outer handle intrusion event. More particularly, in each embodiment the contact surface 98, 398 can be positioned with respect to the rod 16, 116, 216 and 316 such that the rod strokes less than the distance 0.4 d, less than a distance 0.5 d, less than a distance 0.6 d or even less than a distance 0.7 d in the releasing direction (arrow 62) prior to the rod impacting the contact surface during an outer handle intrusion event. Furthermore, the bracket 20, 320 and the rod 16, 116, 216, 316 are configured to cooperate such that after impact with the contact surface 98, 398 of the bracket by the rod further movement of the rod in the releasing direction (arrow 62) is inhibited.

Vehicle door assemblies have been described above with reference to a number of different embodiments. Modifications and alterations will occur to those upon reading and understanding the preceding detailed description. For example, the components that were described with reference to one embodiment could be employed in another embodiment. Nevertheless, the invention is not limited to only those embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle door assembly comprising:
an outer handle assembly mounted to an outer panel of a vehicle door and including a movable handle;
a latch mechanism including a latch for engaging a striker and an outer handle lever operably connected to the latch;
a rod connecting the outer handle assembly to the latch mechanism;
an internal frame member in the vehicle door inwardly offset from the outer panel; and
a bracket mounted to the internal frame member and including a contact surface inwardly offset from the outer panel, the contact surface being positioned with respect to the rod such that inward lateral movement of the handle during an outer handle intrusion event results in the rod moving laterally inward and impacting the contact surface, wherein impact with the contact surface by the rod inhibits the rod from moving the outer handle lever in an unlatching direction.

2. The vehicle door assembly of claim 1, wherein the bracket is configured to catch the rod as a result of the rod impacting the contact surface.

3. The vehicle door assembly of claim 1, wherein the internal frame member is a lower sash member that carries a window pane.

4. The vehicle door assembly of claim 1, wherein movement of the handle in an opening direction results in the rod being stroked in a releasing direction and when the rod is stroked a distance d in the releasing direction the latch is in an open position where the latch is disengaged from the striker, and wherein the contact surface is positioned with respect to the rod such that the rod strokes less than the distance d in the releasing direction prior to the rod impacting the contact surface during the outer handle intrusion event.

5. The vehicle door assembly of claim 4, wherein the contact surface is positioned with respect to the rod such that the rod strokes less than a distance about 0.4 d in the releasing direction prior to the rod impacting the contact surface during the outer handle intrusion event.

6. The vehicle door assembly of claim 1, wherein the outer handle lever includes an outboard U-shaped terminal portion that is open laterally outboard and the rod is received in the U-shaped terminal portion.

7. The vehicle door assembly of claim 6, further comprising a rod holder clip including an opening, the rod being received in the opening and the rod holder clip being received in the U-shaped terminal portion, wherein the rod holder clip is configured to deform during the outer handle intrusion event to disengage the rod holder clip and the rod from the outer handle lever during the outer handle intrusion event.

8. The vehicle door assembly of claim 1, wherein pivotal movement of the rod about a location on the rod near where the rod impacts the contact surface during the outer handle intrusion event results in the rod disengaging from the outer handle lever.

9. The vehicle door assembly of claim 1, wherein the rod includes an upper rod engaging the outer handle assembly, a lower rod engaging the latch mechanism, and a coupling mechanism coupling the upper rod to the lower rod, wherein the upper rod decouples from the lower rod as a result of the rod impacting the contact surface during the outer handle intrusion event.

10. The vehicle door assembly of claim 9, wherein the upper rod decouples from the lower rod as a result of the lower rod impacting the contact surface during the outer handle intrusion event.

11. The vehicle door assembly of claim 1, wherein the rod includes weakened section where the rod breaks as a result of impact with the contact surface during the outer handle intrusion event.

12. The vehicle door assembly of claim 11, wherein the weakened section is a necked down portion of the rod.

13. A vehicle door assembly comprising:
an outer panel;
an outer handle assembly mounted to the outer panel and including a movable handle;
a latch mechanism including a latch for engaging a striker and an outer handle lever operably connected to the latch;
a rod connecting the outer handle assembly to the latch mechanism, wherein movement of the handle in an opening direction results in the rod being stroked in a releasing direction to move the outer handle lever toward an unlatching direction, which moves the latch toward a disengaging direction to disengage the striker, when the rod is connected with the outer handle lever and is in an initial position prior to movement of the handle in the opening direction, the latch is in a closed position where the latch engages the striker, and when the rod is connected with the outer handle lever and is stroked a distance d in the releasing direction the latch is in an open position where the latch is disengaged from the striker;
an internal frame member inwardly offset from the outer panel; and
a bracket mounted to the internal frame member and including a contact surface that is inwardly offset from the rod, the bracket being positioned with respect to the rod such that inward lateral movement of the handle during an outer handle intrusion event results in the rod moving laterally inward and impacting the contact surface, wherein the bracket and the rod are configured to cooperate such that after impact with the contact surface of the bracket by the rod further movement of the rod in the releasing direction is inhibited.

14. The vehicle door assembly of claim 13, wherein the outer handle lever is configured such that impact with the contact surface by the rod during the outer handle intrusion event results in the rod disengaging from the outer handle lever.

15. The vehicle door assembly of claim 13, wherein the rod includes an upper rod engaging the outer handle assembly, a lower rod engaging the latch mechanism, and a coupling mechanism coupling the upper rod to the lower rod, wherein the upper rod decouples from the lower rod as a result of the rod impacting the contact surface of the bracket during the outer handle intrusion event.

16. The vehicle door assembly of claim 13, wherein the rod includes weakened section where the rod breaks as a result of impact with the contact surface of the bracket during the outer handle intrusion event.

17. The vehicle door assembly of claim 13, wherein the bracket catches the rod as a result of the rod impacting the contact surface of the bracket.

18. The vehicle door assembly of claim 17, wherein the rod includes an upper rod section engaging the outer handle assembly and terminating at a lower bend, a lower rod section engaging the latch mechanism and terminating at an upper bend, and a transverse section interconnecting the upper rod section to the lower rod section.

19. The vehicle door assembly of claim 17, wherein the bracket includes a mounting leg that is fastened to the internal frame member and a contact leg that defines the contact surface formed by a notch in the contact leg.

20. A vehicle door assembly comprising:
- an outer handle assembly connected with a vehicle door and including a movable handle;
- a latch mechanism including a latch for engaging a striker and an outer handle lever operably connected to the latch, wherein the outer handle lever includes an outboard U-shaped terminal portion that is open laterally outboard and the rod is received in the U-shaped terminal portion;
- a rod connecting the outer handle assembly to the latch mechanism;
- a contact surface associated with the vehicle door and inwardly offset from the rod, the contact surface being positioned with respect to the rod such that inward lateral movement of the handle during an outer handle intrusion event results in the rod moving laterally inward and impacting the contact surface, wherein impact with the contact surface by the rod inhibits the rod from moving the outer handle lever in an unlatching direction; and
- a rod holder clip including an opening, the rod being received in the opening and the rod holder clip being received in the U-shaped terminal portion, wherein the rod holder clip is configured to deform during the outer handle intrusion event to disengage the rod holder clip and the rod from the outer handle lever during the outer handle intrusion event.

* * * * *